United States Patent [19]

Murphree

[11] Patent Number: 5,949,738

[45] Date of Patent: Sep. 7, 1999

[54] SONAR TARGET SIMULATION

[75] Inventor: Francis J. Murphree, Winter Park, Fla.

[73] Assignee: The United States of America as represented by the Secretary of the Navy, Washington, D.C.

[21] Appl. No.: 05/248,882

[22] Filed: May 1, 1972

[51] Int. Cl.[6] ...................................................... H04K 3/00
[52] U.S. Cl. ................................................................. 367/1
[58] Field of Search ...................................... 340/5 D, 3 E; 35/10.4; 367/1; 434/8

[56] References Cited

U.S. PATENT DOCUMENTS 2,887,671   5/1959   Frankel et al. .

*Primary Examiner*—Daniel T. Pihulic
*Attorney, Agent, or Firm*—Robert W. Adams

[57] ABSTRACT

Sonar echoes of length $s/c\,(\cos\theta_i + \cos\theta_r) + T$ are simulated by transmitting properly timed replicas of an illuminating signal from a number of projectors spaced along a cable of target length s. Because of the length of this cable, magnetic anomaly effects can be simulated by passing a current through a conductor within it.

8 Claims, 2 Drawing Sheets

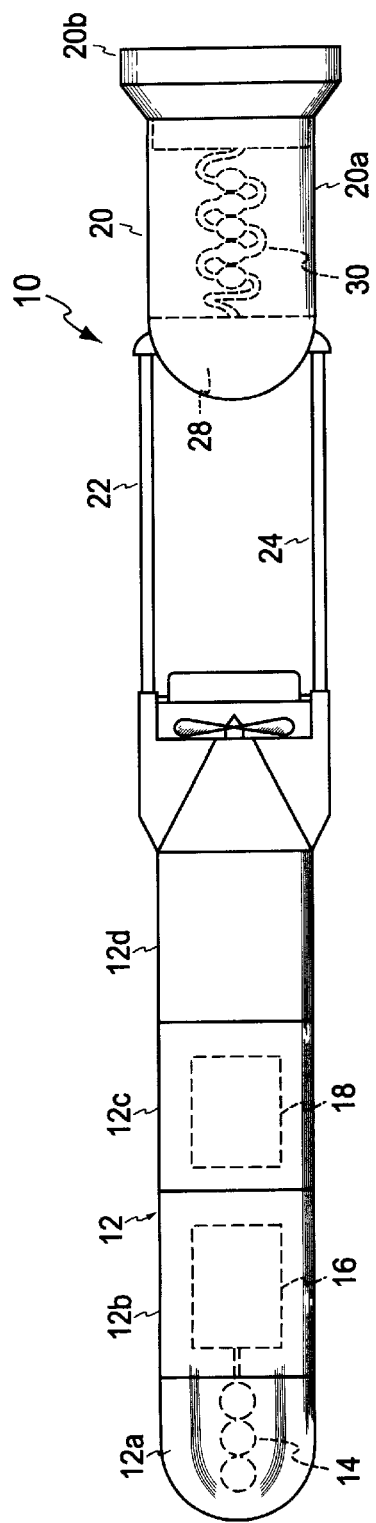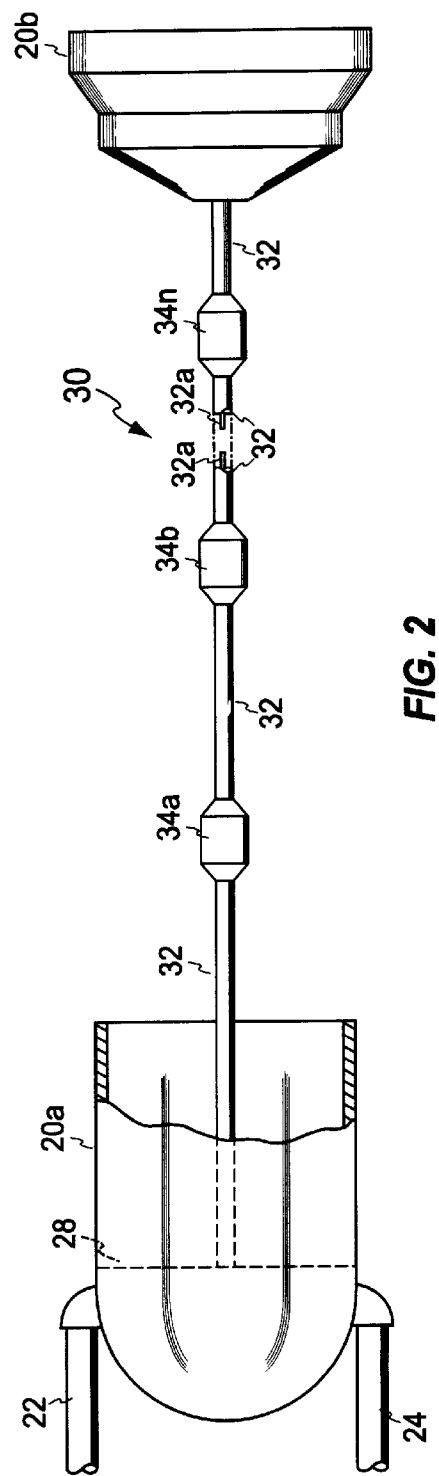

SONAR TARGET SIMULATION

BACKGROUND OF THE INVENTION

This invention relates to the art of sonar target simulation and more particularly to the realistic simulation say of a submarine as a target to train sonar operators, test sonar equipment, or for operational decoy purposes.

Submarine targets have been simulated heretofore by motorized target devices, generally about the size and configuration of a conventional submarine torpedo, which carry electronic means for receiving a sonar ping signal, modifying the signal to have characteristics of a reflected ping, and then transmitting the modified signal so that when received and processed by the tracking sonar it will resemble an actual submarine target echo. One example of such a device is given in U.S. Pat. No. 3,180,295.

Various systems and methods have been devised for such modifying of an active sonar signal to "look" like a truly submarine reflected echo signal. Among the echo features simulated are target length, target reflective highlights, and target aspect angle. Electronic systems for accomplishing these are exemplified by U.S. Pat. 3,641,485 and copending applications for patent Ser. No. 94,134, filed Dec. 1, 1970, now U.S. Pat. No. 3,671,657, and Ser. No. 134,558, filed Apr. 16, 1971, now U.S. Pat. No. 3,713,081. While the techniques described therein provide very effective results in simulating submarine echoes to the sonar equipment that is doing the searching or tracking, for the reasons about to be discussed the cooperation of a second sonar equipped ship which receives the simulated echoes can result in a determination that the echoes are from something other than an actual submarine, e.g., a decoy.

The duration of an echo returned by a lone, narrow target such as a submarine, measured on a line connecting the target and the illuminating sonar, is approximately $2s/c |\cos \theta_i| + T$ seconds, where s is the target length, c the velocity of sound, $\theta_i$ the angle between the target axis and the direction of the sound source, and T is the pulse length. Measured along any other line (such as in a direction toward a listening ship), the echo length is $s/c (\cos \theta_i + \cos \theta_r) + T$, where $\theta_r$ is tile angle made by the reflected sound in the direction of tile receiver with the target axis (see Urick, "Principles of Underwater Sound for Engineers", p 26).

Echoes having a length of $2s/c |\cos \theta_i| + T$ seconds may be generated using several techniques some of which are described in the aforementioned patent and applications. When radiated front a buoy or torpedo in response to an illuminating pulse, these small targets appear to the sonar transmitting the pulse as an actual submarine target. To a sonar observer on a second ship, however, it will be noticed that the echo length is a function only of $\theta_i$, i.e., it does not change with changes in position bearing of this second ship relative to the target. The reason for this is that the "echo" is radiated from a single projector—essentially a point source at the mobile simulator. By means of a radio link between the two ships, the echoes can be compared and the fact that their lengths remain approximately the same used to distinguish this simulated echo from real submarine echoes that may be present.

SUMMARY OF THE INVENTION

With the foregoing in mind, it is a principal object of this invention to provide a sonar target simulator which is capable of generating, from an insonifying sonar signal from the sonar equipment of one vessel, an echo signal which will resemble that of an actual target when received by the sonar equipments of other vessels as well as to that of the one vessel, even though the target simulator presents a different aspect to those other vessels.

Another object of this invention is the provision of a novel submarine target simulator which is readily stored, handled, and deployed because of its compact size, yet which operates to effectively produce simulated echo signals which faithfully produce characteristics of a full size target on sonars whether operating in active or passive mode and irrespective of aspect angles.

As another object this invention aims to accomplish the foregoing through the use of a target simulator which comprises a hull structure housing propelling machinery and echo simulating electronic means and is characterized by an elongated tow, preferably in the form of a cable which can be initially housed in the hull, or an adjunct thereto, and then streamed out during operation, which tow includes a plurality of sound emitting hydrophones spaced therealong and operated in proper time and amplitude relation to an insonifying sonar signal to produce a simulated echo analogous to that of a selected hull length and shape.

The invention may further be said to reside in certain combinations and arrangements of parts which cooperate to accomplish the aforementioned objects and advantages as well as others which will become apparent from the following description of the preferred embodiment when read in conjunction with the accompanying sheets of drawings.

DESCRIPTION OF THE DRAWINGS

FIG. 1 is a side elevational view of a target simulator device embodying the invention;

FIG. 2 is a fragmentary view, on an enlarged scale, of a portion of the device of FIG. 1 but with a projector tow in streamed position.

DESCRIPTION OF THE PREFERRED EMBODIMENT

Figure 3:
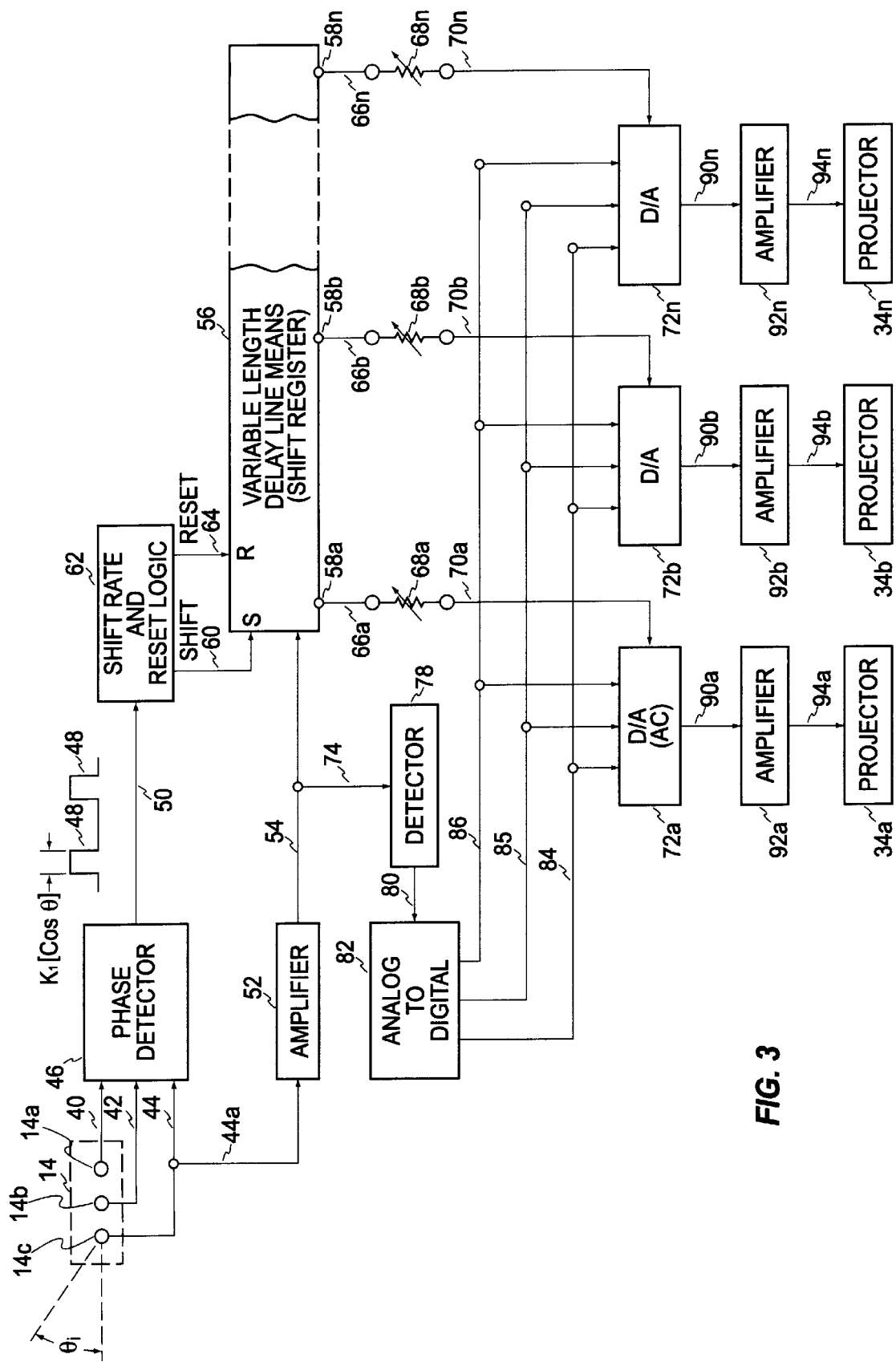
FIG. 3 is a diagrammatic illustration, in block form, of some of the electronics of the device of FIGS. 1 and 2.

In the form of the invention illustrated in the drawings and described hereinafter a submarine target simulator is indicated generally at 10 and comprises a forward or tractor portion 12 having a hull configuration resembling a conventional submarine torpedo. The tractor portion 12 of the device 10 includes an acoustically transparent nose section 12a which houses a phase detecting probe means 14, preferably of the type described ill copending patent application Ser. No. 173,762, filed Aug. 23, 1971, and assigned to the assignee hereof. The phase detecting probe means serves aspect determining electronic circuitry 16 housed in the section 12b of the tractor portion of the device. The aspect detection circuitry may also be of the kind described in the just mentioned application.

Housed in the section 12c of the tractor portion is low frequency noise projection means 18 which generates and projects sounds simulative of machinery propeller cavitation sounds of an actual submarine in accordance with the particular depths and speeds. The projection means 18 may advantageously comprise circuitry of the type described in copending application Ser. No. 155,053, filed Jun. 21, 1971, now U.S. Pat. No. 3,676,802, and assigned to the assignee hereof. Section 12d of the tractor portion 12 houses propulsion machinery, batteries, steering and depth controls and the like.

The device 10 further comprises a second or trailer portion 20 as an adjunct to the tractor portion 12, the portion 20 being conveniently connected to the portion 12 by links 22, 24 at least one of which in this example includes electrical conductors for connecting tile electronic circuitry 16 in the portion 12 to circuit components in the portion 20 which will be described as this specification proceeds.

The trailer portion 20 comprises a hull section 20a which houses in tie forward part thereof electronic circuitry 28. The remainder of the hull section 20a, which prior to actual use has its after end closed by a drogue section 20b, contains a cable and spaced projector assembly 30. The drogue section 20b preferably has neutral or close to neutral buoyancy.

Referring to FIG. 2, when the device 10 is in operation, the drogue section 20b is released and separated from the hull section 20a so as to stream aft and deploy the cable and spaced projector assembly 30 as a tow. The assembly 30, only a portion of which is shown, comprises electrical cabling 32 along the length Of which are spaced a plurality of hydrophone projectors as exemplified by 34a, 34b and 34n. The assembly 30 preferably has a length which substantially equals the length of the class of submarine vessel which is being simulated. The projectors 34a, 34b through 34n are preferably provided in number and in spacing so as to provide, when energized by the electronics in the manner about to be described to produce simulated echoes analogous of those produced by tile structural highlights and configurations of the submarine hull being simulated.

Referring now to FIG. 3, the circuitry associated with operation of the projectors 34a, 34b, - - - 34n will be described. The phase sensing probe means 14 are here shown as comprising three spaced hydrophones 14a, 14b, and 14c which are connected as shown by lines 40, 42, and 44 to the phase detector circuit 46. The circuit 46, which may conveniently be of the type discloses in the aforementioned application Ser. No. 173,762, provides a series of output pulses 48 on line 50. The widths of the pulses 48 are proportional to the absolute value of the cosine of the aspect angle θ of the simulated target with respect to the insonifying sonar signal direction of travel. The pulses 48 are used to control the aspect dependent time delays between energizing of the spaced projectors 34a, 34b, - - - 34n to produce successive signals simulative of highlight echoes all in a manner which will presently be made apparent.

The insonifying sonar signals received b)y the probe means are also applied, as shown by line 44a, to an amplifier 52, the output of which is applied via line 54 to the input of a variable length delay line means in the form of a shift register 56.

The shift register 56 has a sufficient number of stages to permit an output tap corresponding to each of the highlight simulating projectors to be used. Additional untapped stages may of course be used between the tapped stages where the delays between highlights are not equal.

The amplified sonar signals on line 54 are applied to the shift register first stage, it being assumed for convenience that the shift register includes any necessary shaping or limiting means for converting the sonar signal to an electrical condition suitable for shifting through the register. The shift register is repeatedly shifted at a rate proportional to $k_1|\cos \theta|$ by shift command pulses received via line 60 from shift rate and reset logic means 62 which is responsive to the pulses 48 from the phase detector 46. The logic 62, which also provides the necessary reset command via line 64, may embody the type of circuitry described for those purposes in the aforementioned U.S. Pat. No. 3,713,081.

The shift register taps 58a, 58b, - - - 58n are connected as shown by lines 66a, 66b, - - - 66n, variable resistors or attenuators 68a, 68b, - - - 68n, and lines 70a, 70b, - - - 70n to digital to analog converters 72a, 72b, - - - 72n. The resistors 68a, 68b, - - - 68n are provided to allow selection of different degrees of reflectivity for different points along the simulated submarine hull. It should be noted at this point that the active sonar signals which are amplified and applied to the shift register input have a frequency which is characteristic of the tracking sonar whether FM or CW. There will therefore appear at each of the taps, in delayed succession, a replica of tie sonar input signal. The replicas will be accurate as to frequency and duration, but because of the preferred use of digital type shift register the replicas at the taps may be inaccurate in amplitude.

A portion of the output of the amplifier 52 is directed as shown by lines 54, 74 to an amplitude detector 78 having linear input/output characteristics, and which has its output connected via line 80 to an analog to digital converter 82. The output of the converter 82, which is here represented by lines 84, 85, and 86 as in three bit form although other forms may of course be used, constitutes a digital word representation of the amplitude of the active sonar signals. This amplitude information in digital form is applied as an input to each of the digital to analog converters 72a, 72b, - - - 72n. These converters serve to alter the amplitudes of the A.C. frequency inputs thereto from the respective shift register taps via tile reflectivity resistors 68a, 68b, - - - 68n. These inputs may be considered as the reference level input to the converters 72a, 72b, - - - 72n.

The outputs of the converters 72a, 72b, - - - 72n will therefore each have the frequency of the active sonar signal from which they were derived and an amplitude which depends both upon the setting of the corresponding reflectivity resistor and upon the amplitude of the active sonar signal. These outputs are respectively fed as shown by lines 90a, 90b, 90n via amplifiers 92a, 92b, - - - 92n and lines 94a, 94b, 94n to the projectors 34a, 34b, 34n.

In the operation of the device 10 it will se appreciated that each projector 34a, 34b, - - - 34n will provide a replica of the sonar signal to be transmitted into the water at the appropriate place and time to simulate sonar signal reflections from an actual submarine. Moreover, the replicas will automatically incorporate doppler and, because of tile spacing of the projectors, the factor of $\frac{s}{c} \cos \theta_r$ is introduced by the water path to the length of the simulated echo as received by a listening sonar station. Accordingly, the objective or providing a total echo length of $\frac{s}{c} (\cos \theta_i + \cos \theta_r) + T$ is realized by the use of the apparatus describes.

Advantage can be taken of the fact that this echo simulation technique requires the projectors to be spaced along a cable, approximately as long as the actual target being simulated, to incorporate simulation of tie magnetic anomally effects of an actual submarine. This would be accomplished by passing an appropriate current from circuit 28 through a conductor 32 forming part of and running the length of the cable 32.

Obviously many modifications and variations of the present invention are possible in the light of the above teachings. It is therefore to be understood that within the scope of the appended claims the invention may be practiced otherwise than as specifically described.

What is claimed is:

1. A sonar target simulation device comprising:

hull means;

propulsion machinery for propelling said hull means through the water;

a tow adapted to be streamed behind said hull means and comprising cable means and a plurality of sound projectors spaced along said cable means at predetermined locations corresponding to structural features of a submarine which would produce reflective highlights;

phase sensing and detecting means, carried by said hull means, for generating phase related signals representative of the aspect angle of said device with respect to a source of active sonar signals; and circuit means for energizing said projectors to provide substantial replicas of said sonar signals at time intervals corresponding to the spacing of said sound projectors and to said aspect angle.

2. A sonar target simulation device as defined in claim 1, and wherein:

said hull means comprises a hull adjunct for housing said tow in a furled condition prior to use; and drogue means for aiding in extending said tow into a streamed condition behind said hull means when said tow is deployed.

3. A sonar target simulation device as defined in claim 2, and wherein:

said cable means comprises conductor means throughout its length; and means in said hull means for energizing said conductor means to provide a magnetic anomaly simulative of that of a submarine.

4. A sonar target simulation device as defined in claim 1, and wherein said circuit means comprises:

amplifier means for amplifying said active sonar signals; and variable length delay line means, having a plurality of taps therealong each corresponding to one of said projectors, for providing a plurality of delayed outputs each of which is a substantial replica in frequency of said active sonar signals.

5. A sonar target simulation device as defined in claim 4, and wherein said circuit means further comprises:

detector means responsive to the amplified active sonar signals for providing an output corresponding to the amplitude of said active sonar signals;

analog to digital conversion means for converting the output of said detector means into digital word form as the output of said conversion means; and a plurality of digital to analog conversion means, each connected to receive the output from one of said taps as a reference level input and to receive said digital word output as a control input, whereby each of said digital to analog conversion means provides as its output replicas of said active sonar signals having amplitudes which are a function of said active sonar signals.

6. A sonar target simulation device as defined in claim 5, and wherein said circuit means further comprises;

attenuator means connected to the output of each of said taps whereby said replicas are attenuated in accordance with reflectivity of structural elements of a submarine being simulated.

7. A sonar target simulation device as defined in claim 6, and wherein:

said hull means comprises a hull adjunct for housing said tow in a furled condition prior to use; and drogue means for aiding in extending said tow into a streamed condition behind said hull means when said tow is deployed.

8. A sonar target simulation device as defined in claim 7, and wherein:

said cable means comprises conductor means throughout its length; and means in said hull means for energizing said conductor means to provide a magnetic anomaly simulative of that of a submarine.

* * * * *